(12) United States Patent
Bittner et al.

(10) Patent No.: US 7,587,833 B2
(45) Date of Patent: Sep. 15, 2009

(54) TOOL FOR PLUMBING, SQUARING AND ATTACHING

(76) Inventors: Andrew Voran Bittner, 417 Cedar Spring Rd., Bel Air, MD (US) 21015; Gregory S. Snider, 1206 Mazeland Dr., Bel Air, MD (US) 21015

( * ) Notice: Subject to any disclaimer, the term of this patent is extended or adjusted under 35 U.S.C. 154(b) by 33 days.

(21) Appl. No.: 11/735,728

(22) Filed: Apr. 16, 2007

(65) Prior Publication Data

US 2007/0245582 A1 Oct. 25, 2007

Related U.S. Application Data

(60) Provisional application No. 60/792,678, filed on Apr. 18, 2006.

(51) Int. Cl.
*B43L 7/027* (2006.01)
(52) U.S. Cl. .................. 33/474; 33/404; 33/429
(58) Field of Classification Search .......... 33/474, 33/429, 404–411, 475–476, 480–481, 484–485, 33/489, 518, 535, 413, 414, 756
See application file for complete search history.

(56) References Cited

U.S. PATENT DOCUMENTS

| | | | | |
|---|---|---|---|---|
| 4,573,276 A * | 3/1986 | Torczon | | 33/481 |
| 5,727,325 A * | 3/1998 | Mussell | | 33/429 |
| 5,771,597 A * | 6/1998 | Hopf | | 33/474 |
| 5,897,816 A * | 4/1999 | Johnson | | 264/35 |
| 5,933,974 A * | 8/1999 | Walters et al. | | 33/474 |
| 6,122,834 A * | 9/2000 | Rester | | 33/474 |
| 6,230,416 B1 * | 5/2001 | Trigilio | | 33/474 |
| 6,314,652 B1 * | 11/2001 | English | | 33/421 |
| 6,327,786 B1 * | 12/2001 | Felix | | 33/474 |
| 6,578,278 B2 * | 6/2003 | Siefert | | 33/429 |
| 6,622,394 B2 * | 9/2003 | Werner et al. | | 33/474 |
| 7,228,636 B1 * | 6/2007 | Moore | | 33/417 |
| 7,266,899 B2 * | 9/2007 | Sanders | | 33/429 |
| 7,299,559 B2 * | 11/2007 | Moss | | 33/429 |
| 7,305,773 B2 * | 12/2007 | Hios | | 33/429 |
| 7,398,601 B2 * | 7/2008 | Morrell | | 33/429 |
| 2003/0204963 A1 * | 11/2003 | Siefert | | 33/429 |
| 2005/0257390 A1 * | 11/2005 | Moss | | 33/429 |
| 2006/0201009 A1 * | 9/2006 | Moss | | 33/429 |

* cited by examiner

*Primary Examiner*—Yaritza Guadalupe-McCall

(57) ABSTRACT

The present invention is generally related to products and methods for leveling, plumbing, squaring and a frame to a structure during its attachment.

18 Claims, 5 Drawing Sheets

TOOL FOR PLUMBING, SQUARING AND ATTACHING

RELATED APPLICATION

This Application claims the benefit of priority from U.S. Provisional Application 60/792,678 filed Apr. 18, 2006.

FIELD OF THE INVENTION

The present invention is generally related to products and methods for leveling, plumbing and squaring a frame during its attachment to a building. Specifically, the product of the present invention allows one to easily level, plumb and square a door.

BACKGROUND OF THE INVENTION

Building construction involves precise measurements and calculations in order for a structure to be properly built. One mistake or miscalculation can be magnified many times over and can result in the redoing and recalculation of substandard work. No construction feature requires more precision and accuracy than setting door frames. Typically a door frame is inserted into a rough of a structure being developed. A rough may be defined as a frame opening in a structure including metal or wood studs. Problems associated with the placement of a door frame is the ability of an operator to accurately level, plumb, and square the frame within the rough as it is being attached to the metal or wooden studs. The operator often finds it difficult to hold a frame in place, while making sure the frame is level, plumb and square with one hand, and attaching the frame to the rough with the other hand. Often the frame moves before attachment so that after attachment it is no longer level, plumb or square.

SUMMARY OF THE INVENTION

Accordingly, it is an object of the present invention to meet the foregoing needs by providing products and methods for leveling, plumbing and squaring a frame during its attachment to a structure.

BRIEF DESCRIPTION OF THE DRAWINGS

The accompanying drawings, which are incorporated in and constitute a part of this specification, illustrate embodiments of the present invention and, together with the description, explain the advantages, and principles, of the invention.

DETAILED DESCRIPTION OF THE INVENTION

Reference will now be made to the preferred embodiments of this invention, examples of which will be obvious from the description of the invention. The current invention relates to methods and products for leveling, plumbing, and squaring frames within a structure, specifically during construction of a building, home or office. In order to better understand the invention, the following terms have been defined.

Figure 1:
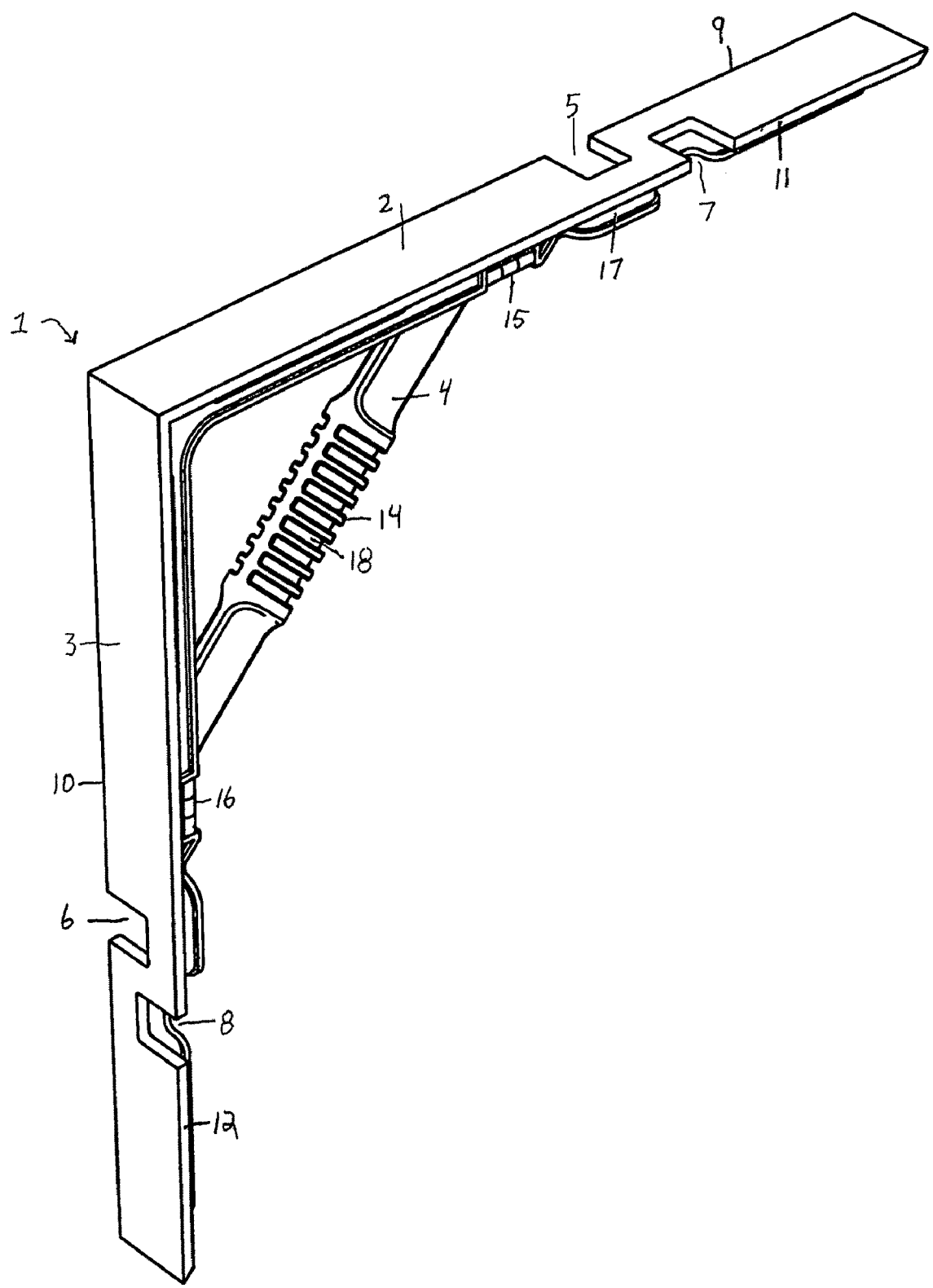
FIG. 1 A Top View of the Tool.

As shown in FIG. 1, tool 1 includes three arms designated first arm 2, second arm 3, and third arm 4. The first arm 2 is attached at one of its ends to an end of a second arm 3 to form a right angle. A third arm 4 intersects the first arm 2 and second arm 3 to form a hypotenuse.

On the first arm 2 are two fastening slots, a first fastening slot 5 and a third fastening slot 7, and a first level means 15. The first fastening slot 5 starts at and inward from a first edge 9 located on the first arm 2. The third fastening slot 7 starts at and inward from a third edge 11 of the first arm 2. A first level means 15 is located inward from the first edge 9 of the first arm 2 and located along the length of the first arm 2.

On the second arm 3 are two fastening slots, a second fastening slot 6 and a fourth fastening slot 8, and a second level means 16. The second fastening slot 6 starts at and inward from a second edge 10 of the second arm 2. The fourth fastening slot 8 starts at and inward from a fourth edge 12 of the second arm 2. A second level means 16 is located inward from said second edge 10 of the second arm 3 and located along the length of the second arm 3.

It is preferred that the tool of the present invention include a grip 14 on the third arm 4 so that the tool can be easily held by an operator. As shown in FIG. 1, the grip is molded into the tool as slots 18 over which an operator may place his or her hands to hold the tool. It is also preferred that the tool contain a dimensional cross member 17 for purposes of adding strength and support to the tool. The design of the tool as shown in FIG. 1 is preferred because it allows operators, which are right handed or left handed, to easily use the tool. Tool 1 is an ambidextrous version of a tool of the present invention.

Figure 2:
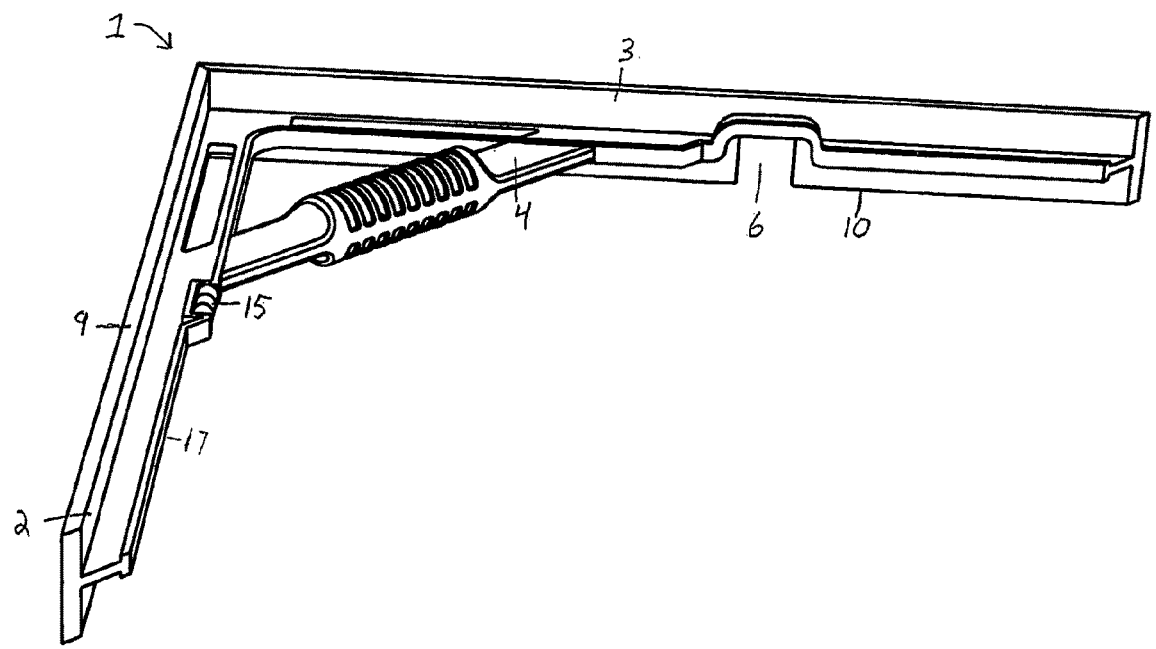
FIG. 2 A Side View of the Tool.

As shown in FIG. 2 is another version of the tool 1 of the present invention. Tool 1 includes three arms designated first arm 2, second arm 3, and third arm 4. The first arm 2 is attached at one of its ends to an end of a second arm 3 to form a right angle. A third arm 4 intersects the first arm 2 and second arm 3 to form a hypotenuse. On the first arm 2, is a first level means 15 located inward from said first edge 9 and located along the length of the first arm 2. On the second arm 3 is a second fastening slot 6 that starts at and inward from the second edge 10. A dimensional cross member 17 is present for purposes of adding strength and support to the tool. This tool described in FIG. 2 is able to level, plumb and square a door when the tool 1 is placed in a top corner of a frame and the first arm 2 is pressed against and adjacent to a top side of a frame and the second arm 3 is pressed adjacent to the long side of the frame.

Figure 3:
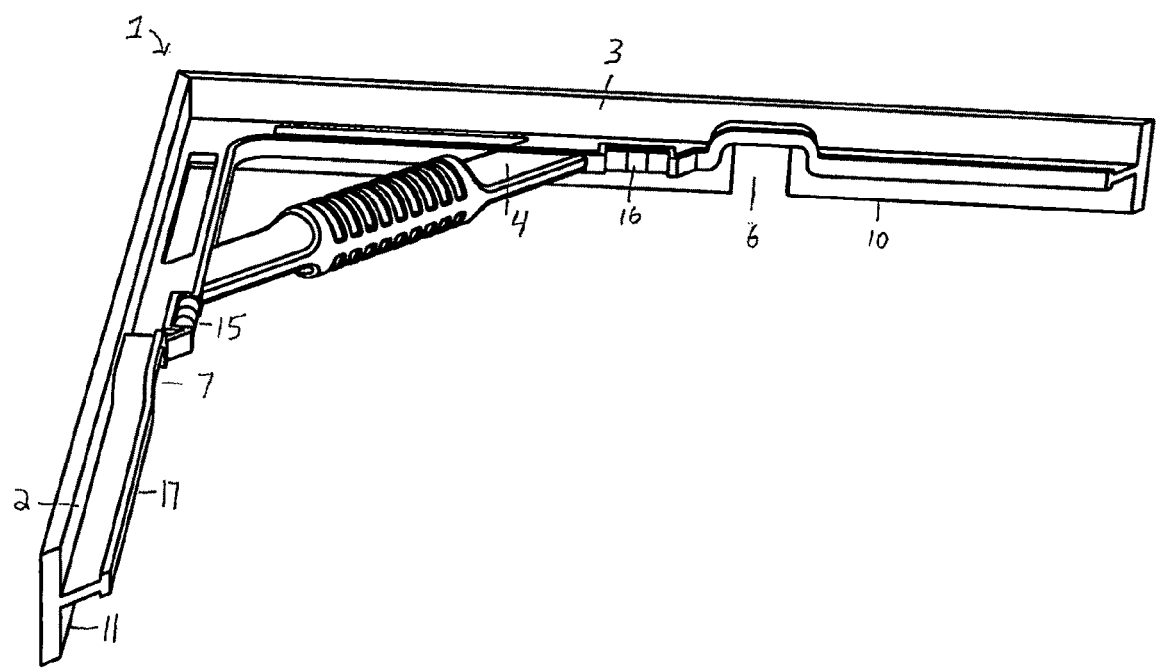
FIG. 3 Another Side View of the Tool.

As shown in FIG. 3 is another version of the tool 1 of the present invention. Tool 1 includes three arms designated first arm 2, second arm 3, and third arm 4. The first arm 2 is attached at one of its ends to an end of a second arm 3 to form a right angle. A third arm 4 intersects the first arm 2 and second arm 3 to form a hypotenuse. On the first arm 2, is a first level means 15 located inward from said third edge 11 and located along the length of the first arm 2. Also on the first arm 2 is a third fastening slot 7, which starts at and inward from a third edge 11 of the first arm 2. On the second arm 3 are a second fastening slot 6 that starts at and inward from the second edge 10 and a second level means 16. The second level means 16 is located inward from said second edge 10 of the second arm 3 and located along the length of the second arm 3. A dimensional cross member 17 is present for purposes of adding strength and support to the tool.

Figure 4:
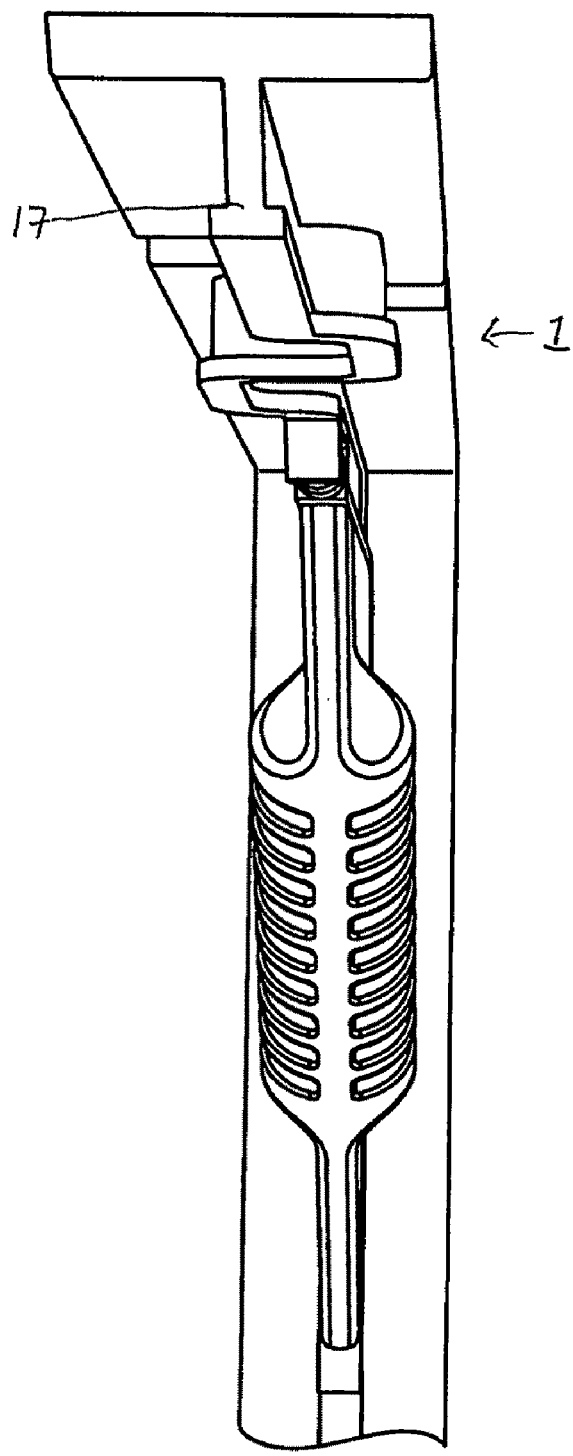
FIG. 4 An Underside View of the Tool.

As shown in FIG. 4 is an illustration of a dimensional cross member 17 of the tool 1 having a "T" shape.

Figure 5:
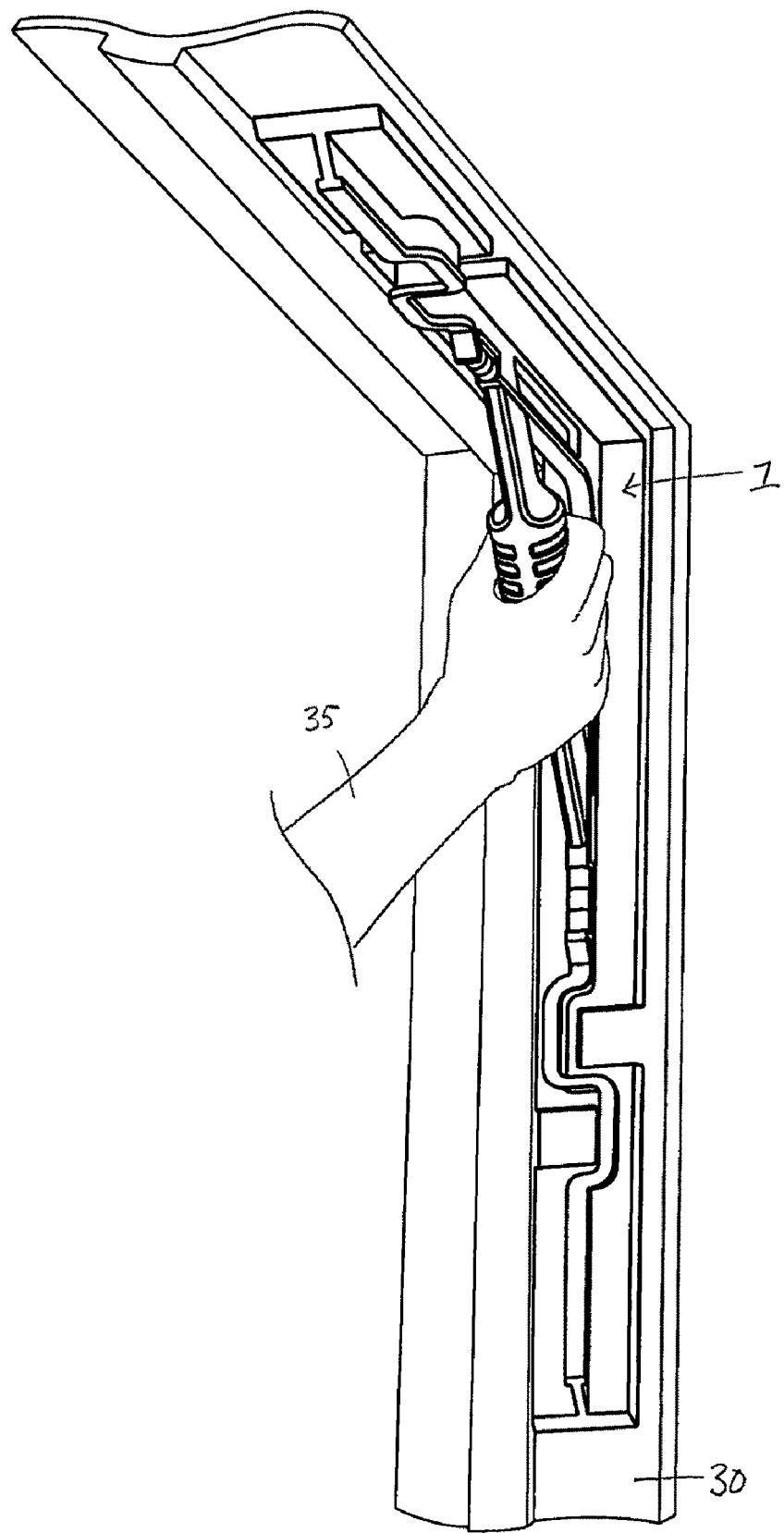
FIG. 5 A Hand-Held View of the Tool.

As shown in FIG. 5 is an illustration of tool 1 being inserted into a frame 30 by an operator 35 for purposes of plumbing, squaring and attaching.

Elements of the Tools of the Present Invention

The first arm 2 and the second arm 3 of the tool 1 of the present invention each may contain one or more level means along the length of their arms. The level means used in the present invention may include circular levels, tubular levels, spirit levels, plate levels, acrylic levels or any combination thereof. It is preferred that the level means of the present invention are replaceable such as tubular level that are finned at the ends to snap in and out of place on the arms.

The first arm 2 and the second arm 3 of the tool 1 of the present invention each may contain one or more fastening slots. The fastening slots are designed to allow an attaching device to be placed through the slot and allow the frame to be attached to a structure while the operator is holding a frame in place with the tool 1.

A frame may be attached to a structure by using an attaching device such as a nails, screws, tacks, or other suitable attaching device. A nail gun may be used to insert nails into the frame.

A grip 14 may be attached to the third arm 4 of the tool 1 to provide comfort and eliminating slippage. The grip 14 of the presence invention may be molded into the device, for example slots 18, as shown in FIG. 1, or a grip may be attached to the third arm 4. A grip 14 attached to the third arm 4 may be made of leather, plastic, a combination thereof, or any other form of material that prevents slippage.

The tool of the present invention may include a dimensional cross member that adds strength and support to the tool. As shown in FIG. 4, the dimensional cross member has a "T" shape and preferably runs along the entire length of the tool. The dimensional cross member may take any shape that adds support to the tool. As shown in FIG. 4 the dimensional cross member runs along the length of the first arm 2 and the second arm 3.

The third arm 4 may intersect the first arm 2 and the second arm 3 anywhere along their lengths provided there is space for an operator to place his or her hand on the third arm 4 for holding the tool. Also, the level means and the fastening slot may be located anywhere along the lengths of the first arm 2 and the second arm 3 if the version of the tool contains such elements on each of these arms. Consequently, a fastening slot may be located closer to the right angle of the tool then a level means or vice versa. Also, the third arm 4 may intersect the first arm 2 or the second arm 3 at a place on the arm located closer to the right angle of the tool than a level means or a fastening slot. There are many variations of the tools of the present invention based on the locations of the above-identified elements.

Method of Using the Tool.

The tools of the present invention allow frames to be attached level, plumb, and square to a structure, preferably a rough. The method begins by obtaining a frame and placing the frame within the rough. As shown in FIG. 5, an operator places a tool of the present invention into the upper corner of the frame. The first arm 2 of the tool 1 including the level means is placed adjacent to the top side of the rough and the second arm 3 including at least one fastening slot is placed adjacent to the long side of the rough. If an ambidextrous version of the tool is used, such as that depicted in FIG. 1, either the first or second arm may be placed against the top side or long side of the rough. The operator holding the third arm of the tool applies force causing the tool to press against a top corner of the frame and the frame to press against the rough. While the operator maintains force against the frame and rough, the operator views the level means in the arm of the tool located adjacent to the top side of the frame. If the level means indicates the frame is level, the frame is plumb and square because the first arm and the second arm of the tool are at right angles and are pressed against the top corner of the frame. The operator continues to apply force to the tool and now secures the frame to the rough with his or her free hand. The operator obtains an attaching device such as a nail gun. With the operator's free hand the operator picks up the attaching device and places the attaching device through at least one fastening slot. The operator activates the attaching device and attaches the frame to the rough.

Some times shims are place between the frame and the rough prior to leveling, plumbing, squaring and attaching the frame to the rough.

REFERENCES

The foregoing description of embodiments of the present invention provides an exemplary illustration and description, but is not intended to be exhaustive or to limit the invention to the precise form disclosed. Modifications and variations are possible in light of the above teachings or may be acquired from practice of the invention.

What is claimed is:

1. A tool for leveling, plumbing, and squaring comprising:
   a first arm wherein said first arm further comprises a first substantially flat outward face between a first edge and a third edge of said first arm;
   a second arm extending perpendicular to said first arm wherein said second arm further comprises a second substantially flat outward face between a second edge and a fourth edge of said second arm;
   wherein said first arm is attached at one of its ends to an end of the second arm to form a substantially right angle;
   a third arm that intersects said first and second arms to form a hypotenuse, wherein said first, second and third arms are longitudinally within a first plane;
   at least one first level means disposed on at least one of said first arm, said second arm, and said third arm; and
   at least one fastening slot in said second arm, wherein said at least one fastening slot is substantially perpendicular to said first plane.

2. The tool of claim 1 further comprising:
   at least one second fastening slot in said first arm wherein said at least one second fastening slot is substantially perpendicular to said first plane; and
   at least one second level means disposed on at least one of said first arm, said second arm, and said third arm, wherein the tool is ambidextrous so that said first arm or said second arm may be placed adjacent to said top side of said frame.

3. The tool of claim 2 further comprising:
   at least one third fastening slot in said first arm wherein said at least one third fastening slot is substantially perpendicular to said first plane.

4. The tool of claim 3 further comprising:
   at least one fourth fastening slot in said second arm wherein said at least one fastening slot is substantially perpendicular to said first plane.

5. The tool of claim 1 further comprising a grip located on said third arm for holding the tool by hand.

6. The tool of claim 1 further comprising:
   a dimensional cross-member connected to at least one of said first arm and said second arm and located along the entire length thereof, wherein said dimensional cross-member longitudinally extends from said first arm in a direction opposite of said first and second substantially flat surface respectively.

7. The tool of claim 6 further comprising: wherein said dimensional cross-member is T-shaped.

8. A tool for leveling, plumbing, and squaring comprising:
a first arm,
a second arm extending perpendicular to said first arm, where said first arm is attached at one of its ends to an end of the second arm, whereby a substantially right angle is formed;
a third arm, wherein said third arm intersects said first and second arms to form a hypotenuse;
at least one first fastening slot in said first arm starting at and inward from a first edge of said first arm and at least one third fastening slot in said first arm staffing at and inward from a third edge of said first arm;
at least one second fastening slot in said second arm starting at and inward from a second edge in said second arm and at least one fourth fastening slot in said second arm starting at an inward from a fourth edge of said second arm;
at least one first level means inward from said first edge of said first arm and located along the length of the first arm; and
at least one second level means inward from said second edge of said second arm and located along the length of the second arm.

9. The tool of claim 8 wherein said at least one first level means is located on said first arm closer than said at least one first fastening slot on said first arm to where said first arm is attached to said second arm.

10. The tool of claim 8 wherein said at least one second level means is located on said second arm closer than said second fastening slot on said second arm to where said second arm is attached to said first arm.

11. The tool of claim 8 further comprising: a grip located on said third arm for holding the tool by hand.

12. The tool of claim 8 wherein said at least one first fastening slot is located on said first arm closer than at least one first level means on said first arm to where said first arm is attached to said second arm.

13. The tool of claim 8 wherein said at least one second fastening slot is located on said second arm closer than at least one second level means on said second arm to where said second arm is attached to said first arm.

14. The tool of claim 8 wherein said third arm intersects said first and second arms closer to where said second arm extends perpendicular from said first arm than the location of said of at least one first fastening slot in said first arm and said at least one second fastening slot in said second arm.

15. The tool of claim 8 wherein said third arm intersects said first and second arm at a location closer to where said second arm extends perpendicular from said first arm than the location of said first level means and said second level means along the length of said first and said second arms respectively.

16. The tool of claim 8 wherein said third arm intersects said first and said second arm closer to the location where said second arm extends perpendicular from said first arm than said first fastening slot, said second fastening slot, said third fastening slot, said fourth fastening slot, said first level and said second level.

17. A method of framing comprising the steps of:
obtaining a frame;
placing said frame in a structure;
inserting the right angle of a tool in an upper corner of said frame, wherein said tool comprises:
a first arm wherein said first arm further comprises a first substantially flat outward face between a first edge and a third edge of said first arm;
a second arm extending perpendicular to said first arm wherein said second arm further comprises a second substantially flat outward face between a second edge and a fourth edge of said second arm, wherein said first arm is attached at one of its ends to an end of the second arm to form a substantially right angle;
a third arm that intersects said first and second arms to form a hypotenuse, wherein said first, second and third arms are longitudinally within a first plane;
at least one first level means disposed on at least one of said first arm, said second arm, and said third arm; and
at least one fastening slot in said second arm, wherein said at least one fastening slot is substantially perpendicular to said first plane; and
leveling, plumbing and squaring said frame while attaching the frame to a structure.

18. The method of claim 17 further comprising the step of attaching said frame to said structure by placing an attachment means through said at least one first fastening slots of said tool.

* * * * *